(12) United States Patent
Sato

(10) Patent No.: US 8,058,964 B2
(45) Date of Patent: Nov. 15, 2011

(54) LAMINATED COIL COMPONENT

(75) Inventor: Akiko Sato, Yasu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/490,485

(22) Filed: Jun. 24, 2009

(65) Prior Publication Data
US 2009/0251268 A1 Oct. 8, 2009

Related U.S. Application Data

(63) Continuation of application No. PCT/JP2008/050808, filed on Jan. 22, 2008.

(30) Foreign Application Priority Data

Feb. 2, 2007 (JP) .................................. 2007-023808

(51) Int. Cl.
  *H01F 5/00* (2006.01)
  *H01F 27/28* (2006.01)
  *H01F 27/24* (2006.01)
(52) U.S. Cl. ......... 336/232; 336/200; 336/223; 336/234
(58) Field of Classification Search ................... 336/200, 336/223, 232, 234
See application file for complete search history.

(56) References Cited

U.S. PATENT DOCUMENTS

| 5,349,743 | A | 9/1994 | Grader et al. | |
|---|---|---|---|---|
| 6,956,455 | B2 * | 10/2005 | Tokuda et al. | 336/83 |
| 2001/0028538 | A1 * | 10/2001 | Watanabe et al. | 360/319 |
| 2001/0033219 | A1 * | 10/2001 | Iha et al. | 336/90 |
| 2004/0108934 | A1 | 6/2004 | Choi et al. | |
| 2006/0176138 | A1 * | 8/2006 | Ito et al. | 336/200 |

FOREIGN PATENT DOCUMENTS

| EP | 1739695 A1 | * | 1/2007 |
|---|---|---|---|
| JP | 6-96940 A | | 4/1994 |
| JP | 7-57922 A | | 3/1995 |
| JP | 07057922 A | * | 3/1995 |
| JP | 11-97245 A | | 4/1999 |
| JP | 2004-311944 A | | 11/2004 |
| JP | 2006-216916 A | | 8/2006 |

OTHER PUBLICATIONS

Official Communication issued in International Patent Application No. PCT/JP2008/050808, mailed on Apr. 15, 2008.

* cited by examiner

*Primary Examiner* — Anh Mai
*Assistant Examiner* — Ronald Hinson
(74) *Attorney, Agent, or Firm* — Keating & Bennett, LLP

(57) ABSTRACT

In an open magnetic circuit type laminated coil component having a laminate formed by laminating a magnetic layer and a non-magnetic layer or a low magnetic permeability layer and a coil conductor disposed in the laminate, a zirconium oxide is included in the non-magnetic layer or the low magnetic permeability layer forming the laminate. The content of the zirconium oxide in the low magnetic permeability layer is in the range of about 0.02 wt % to about 1.0 wt %. A zirconium oxide is also included in the magnetic layer in a proportion of less than about 1.0 wt %. As the magnetic layer, a material including Ni—Cu—Zn ferrite as a main component is preferably used. As the non-magnetic layer or the low magnetic permeability layer, a material including Cu—Zn ferrite as a main component is preferably used.

4 Claims, 7 Drawing Sheets

LAMINATED COIL COMPONENT

BACKGROUND OF THE INVENTION

1. Field of the Invention

The present invention relates to a laminated coil component, such as a laminated inductor, and more particularly, to an open magnetic circuit type laminated coil component including a coil conductor that is disposed inside a laminate in which a magnetic layer and a non-magnetic layer or a low magnetic permeability layer are laminated.

2. Description of the Related Art

Laminated coil components including a coil conductor that is disposed in a laminate formed by laminating a plurality of coil conductor patterns and a plurality of magnetic ceramic layers are widely used. Among the laminated coil components, a closed magnetic circuit type laminated coil component has problems in that, when a superposed direct current is gradually increased, an inductance value is substantially constant or gradually decreases until the superposed direct current reaches a certain current value, but, after exceeding the certain current value, magnetic saturation arises which sharply reduces the inductance value.

In order to solve the problems, an open magnetic circuit type laminated coil component is known in which a non-magnetic ceramic layer is inserted in a laminate, in which magnetic material ceramic layers (magnetic layer) are laminated, near the center of a coil as viewed in the lamination direction (see Japanese Unexamined Patent Application Publication No. 2004-311944).

The open magnetic circuit type laminated coil component of Japanese Unexamined Patent Application Publication No. 2004-311944 includes a spiral coil L formed by electrically connecting a plurality of coil conductor patterns 55 is built into a laminate 60 formed by laminating magnetic material ceramic layers as shown in FIG. 9. The laminate 60 has a coil portion 51 which is a region in which the spiral coil L is disposed and outer layer portions 52 and 53 laminated outside the coil portion 51. A non-magnetic ceramic layer 54 is disposed at the approximate center of the coil L in the lamination direction of the laminate 60. Moreover, external electrodes 56 and 57 connected to the spiral coil L are disposed in the laminate 60.

In the laminated coil component as described above, the magnetic flux φ generated by the spiral coil L crosses the non-magnetic ceramic layer 54 which prevents magnetic saturation.

However, the open magnetic circuit type laminated coil component in which the non-magnetic ceramic layer 54 is inserted into the laminate 60 in which the magnetic material ceramic layers (magnetic layer) are laminated as described above is produced through a process of firing a laminate in which a laminated magnetic layer and a non-magnetic layer are laminated. The open magnetic circuit type laminated coil component has problems in that the interface between the layers suffers from cracking, chipping, peeling, and other defects, and thus, the properties deteriorate due to different shrinkage behaviors, such as a shrinkage starting temperature or a shrinkage rate, of the layers in a process of firing the magnetic layer (magnetic ceramic layer) and the non-magnetic layer (non-magnetic ceramic layer).

For example, in a firing process after the magnetic layer on which the coil conductor pattern 55 is printed and the non-magnetic layer 54 are laminated in a desired order, the non-magnetic layer is usually sintered and shrunk earlier than the magnetic layer. Therefore, there is a problem in that cracking, chipping, peeling, and other defects, are likely to occur at the interface (particularly at the side of the magnetic layer) between the non-magnetic layer 54 and the magnetic layer that is sintered later than the non-magnetic layer.

Moreover, a laminated chip component has been proposed in which magnetic layers are laminated and whose mechanical strength is increased by blending a zirconium oxide in a proportion of 0.01 wt % to 1.2 wt % in Ni—Cu—Zn ferrite which is a magnetic material (see Japanese Unexamined Patent Application Publication No. 7-57922).

However, the laminated chip component has a closed magnetic circuit structure in which only magnetic layers are laminated, is likely to be magnetically saturated, and is limited to attempting to increase direct current superposition characteristics. Therefore, it is problematic for the laminated chip component to be unable to fully satisfy various demands in terms of properties that are particular to the laminated coil component.

SUMMARY OF THE INVENTION

To overcome the problems described above, preferred embodiments of the present invention provide an open magnetic circuit type laminated coil component having a structure in which a coil conductor is disposed in a laminate in which a magnetic layer and a non-magnetic layer or a low magnetic permeability layer are laminated, in which the development of cracking, chipping, or peeling at the interface between the magnetic layer and the non-magnetic layer or the low magnetic permeability layer or the development of warpage or other defects of the laminate are prevented, magnetic saturation is unlikely to occur, and direct current superposition characteristics are excellent.

A laminated coil component according to a preferred embodiment of the present invention is an open magnetic circuit type laminated coil component having a structure in which a coil conductor is disposed in a laminate including a magnetic layer and a non-magnetic layer or a low magnetic permeability layer that are laminated, in which the non-magnetic layer or the low magnetic permeability layer includes a zirconium oxide.

The content of the zirconium oxide in the non-magnetic layer or the low magnetic permeability layer is preferably in a range from about 0.02 wt % to about 1.0 wt %, for example.

Preferably, a zirconium oxide is blended in the magnetic layer.

Preferably, the content of the zirconium oxide in the magnetic layer is less than about 1.0 wt %, for example.

Preferably, the magnetic layer is made of a material including Ni—Cu—Zn ferrite as a main component, for example, and the non-magnetic layer or the low magnetic permeability layer is made of a material including Cu—Zn ferrite as a main component, for example.

In the laminated coil component according to a preferred embodiment of the present invention, sintering of the non-magnetic layer that is usually sintered earlier than the magnetic layer is delayed by blending a zirconium oxide which has a function of delaying a shrinkage rate in the non-magnetic layer or the low magnetic permeability layer, thereby approximating the shrinkage rates of the magnetic layer and the non-magnetic layer. Thus, the development of cracking, chipping, peeling, and other defects, at the interface of the magnetic layer and the non-magnetic layer or warpage of the laminate resulting from a difference in the shrinkage rate between the magnetic layer and the non-magnetic layer can be effectively prevented.

Thus, preferred embodiments of the present invention provide a laminated coil component that is free from defects, such as cracking, chipping, peeling, or warpage at the interface between the magnetic layer and the non-magnetic layer, that is not likely to be magnetically saturated, and that has excellent direct current superposition characteristics.

Moreover, by adjusting the content of the zirconium oxide in the non-magnetic layer or the low magnetic permeability layer to be in the ranged of about 0.02 wt % to about 1.0 wt %, for example, sintering of the non-magnetic layer is effectively delayed, thereby more reliably preventing the development of cracking, chipping, peeling, and other defects at the interface between the magnetic layer and the non-magnetic layer or the development of warpage of the laminate resulting from the difference in the shrinkage rate between the layers.

When a zirconium oxide is also blended in the magnetic layer, the strength of the magnetic layer (laminate) can be increased. In this case, the shrinkage rates of the magnetic layer and the non-magnetic layer can be approximated by adjusting the amount of the zirconium oxide added to the non-magnetic layer in accordance with the amount of the zirconium oxide to be added to the magnetic layer.

When a zirconium oxide is blended in the magnetic layer, the amount of the zirconium oxide added to the non-magnetic layer needs to be greater than that of the zirconium oxide to the magnetic layer.

Moreover, when the content of the zirconium oxide in the magnetic layer is adjusted to be less than about 1.0 wt %, for example, sintering of the non-magnetic layer or the low magnetic permeability layer is delayed without increasing the content of the zirconium oxide in the non-magnetic layer or the low magnetic permeability layer to an amount which could causes a practical problem, thereby preventing the development of cracking, chipping, peeling, and other defects at the interface between the magnetic layer and the non-magnetic layer or the development of warpage of the laminate resulting from the difference in the shrinkage rate between the layers.

When the magnetic layer is made of a material including Ni—Cu—Zn ferrite as a main component and the non-magnetic layer or the low magnetic permeability layer is made of a material including Cu—Zn ferrite as a main component, the shrinkage rate is effectively controlled by the addition of zirconium oxide.

When a material including Ni—Cu—Zn ferrite as a main component is used as the magnetic layer, the firing temperature (about 900° C. or lower) of the N-i-Cu—Zn ferrite is lower than the melting point (about 960° C.) of Ag, which is typically used as an electrode material for a coil conductor. Thus, a low direct current resistance (reduction in Rdc) can be achieved by suppressing diffusion and/or evaporation of Ag electrode material. Accordingly, a laminated coil component having reduced heat generation can be provided.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Hereinafter, the features of preferred embodiments of the present invention will be described with reference to the drawings.

First Preferred Embodiment

Figure 1:
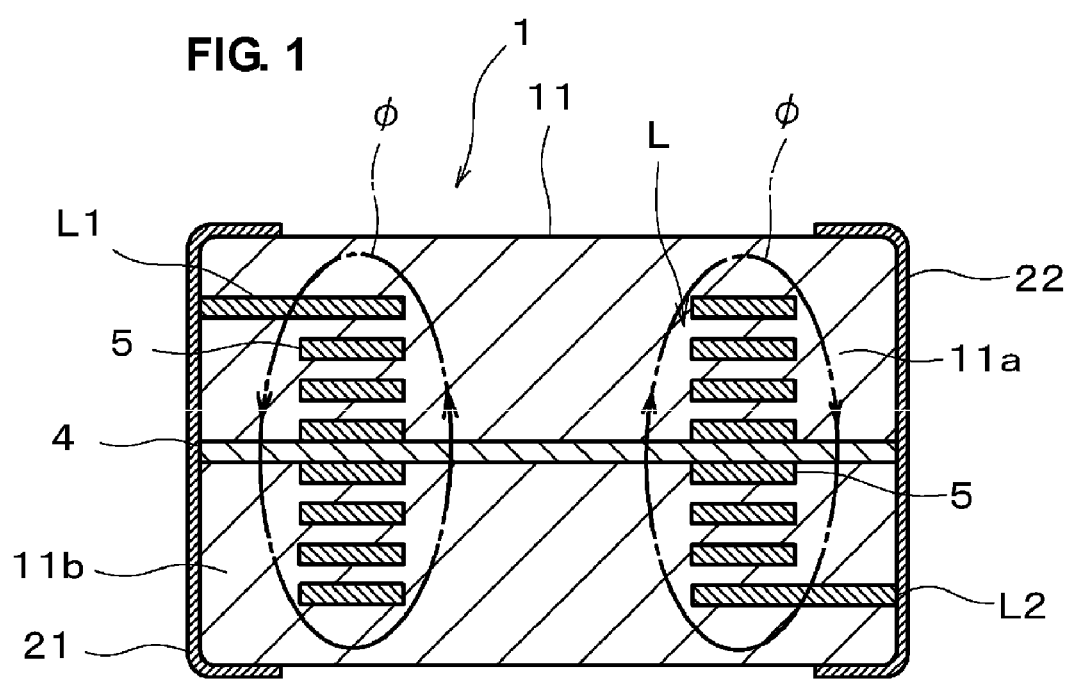
FIG. 1 is a cross section of a laminated coil component according to a preferred embodiment of the present invention.
Figure 2:
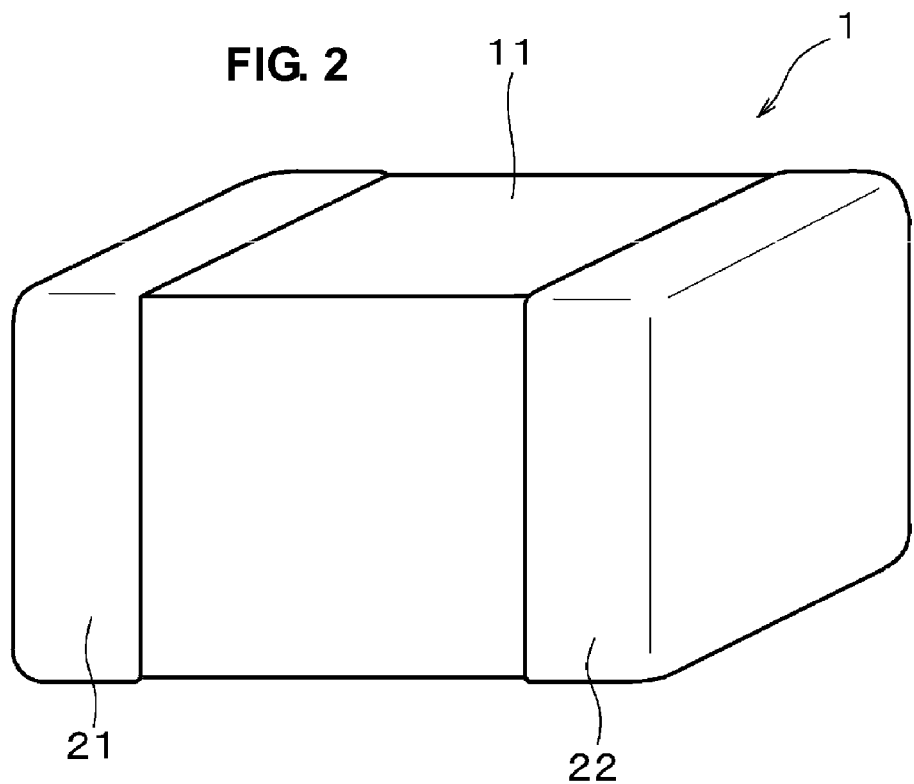
FIG. 2 is a perspective view of the laminated coil component shown in FIG. 1.

FIG. 1 is a cross section of an open magnetic circuit type laminated coil component according to a first preferred embodiment of the present invention and FIG. 2 is a perspective view thereof.

As shown in FIGS. 1 and 2, the laminated coil component 1 is an open magnetic circuit type laminated coil component. The laminated coil component 1 includes a laminate 11 in which magnetic layers are laminated, a spiral coil L that is disposed in the laminate 11 and is formed by electrically connecting a plurality of coil conductors 5, a non-magnetic layer (non-magnetic ceramic layer) 4, preferably made of ceramic, that is disposed at the approximate center of the coil L in the lamination direction of the laminate 11, and external electrodes 21 and 22 that are disposed at both ends of the laminate 11 and connected to ends L1 and L2 of the coil L. The laminated coil component 1 is arranged such that the magnetic flux φ generated by the spiral coil L crosses the non-magnetic layer 4.

In the laminated coil component 1, a magnetic material preferably including Ni—Cu—Zn ferrite as a main component, for example, is preferably used as a material of the magnetic layers defining an upper portion 11a above the non-magnetic layer 4 and a lower portion 11b below the non-magnetic layer 4 in the laminate 11.

Moreover, the non-magnetic layer 4 disposed between the upper portion 11a and the lower portion 11b of the laminate 11, preferably includes Cu—Zn ferrite as a main component, for example.

To the non-magnetic layer 4, a zirconium oxide which functions to control a sintering rate is added in a proportion such that the sintering rates of the magnetic layers and the non-magnetic layer are approximately the same.

Preferably, a zirconium oxide is added to the non-magnetic layer 4 in a proportion of about 0.05 wt % and no zirconium oxide is added to the magnetic layers, for example.

As a result, a laminated coil component can be provided in which a difference in the shrinkage rate between the magnetic layer and the non-magnetic layer in a firing process is small, which does not suffer from cracking, chipping, peeling, or other defects at the interface between the magnetic layer and the non-magnetic layer or from warpage of the laminate, which is not readily magnetically saturated, and which has excellent direct current superposition characteristics.

Next, a method for producing the laminated coil component 1 will be described with reference to FIG. 3.

First, for example, an organic or aqueous binder, a plasticizer, a dispersant, and a defoaming material were added to a Ni—Cu—Zn ferrite powder and then mixed, thereby preparing a ceramic slurry.

Then, the ceramic slurry was applied onto a carrier film so as to form a film preferably by a comma coater method or a doctor blade method, for example, followed by drying, thereby producing a ceramic green sheet for magnetic layer.

Similarly, an organic or aqueous binder, a plasticizer, a dispersant, and a defoaming material, for example, were added to Cu—Zn ferrite powder. Then, a zirconium oxide was added preferably in a proportion of about 0.05 wt %, for example, and mixed, thereby preparing a ceramic slurry.

Then, the ceramic slurry was applied onto a carrier film so as to form a film preferably by a comma coater method or a doctor blade method, for example, followed by drying, thereby producing a ceramic green sheet for a non-magnetic layer.

Next, a laser beam machine was used to form a through hole defining a via hole at a desired location of the ceramic green sheet produced by the methods described above.

Then, a conductive paste preferably including Ag or an Ag alloy as a main component, for example, was screen-printed on a desired region of the ceramic green sheet to form a coil conductor pattern.

Figure 3:
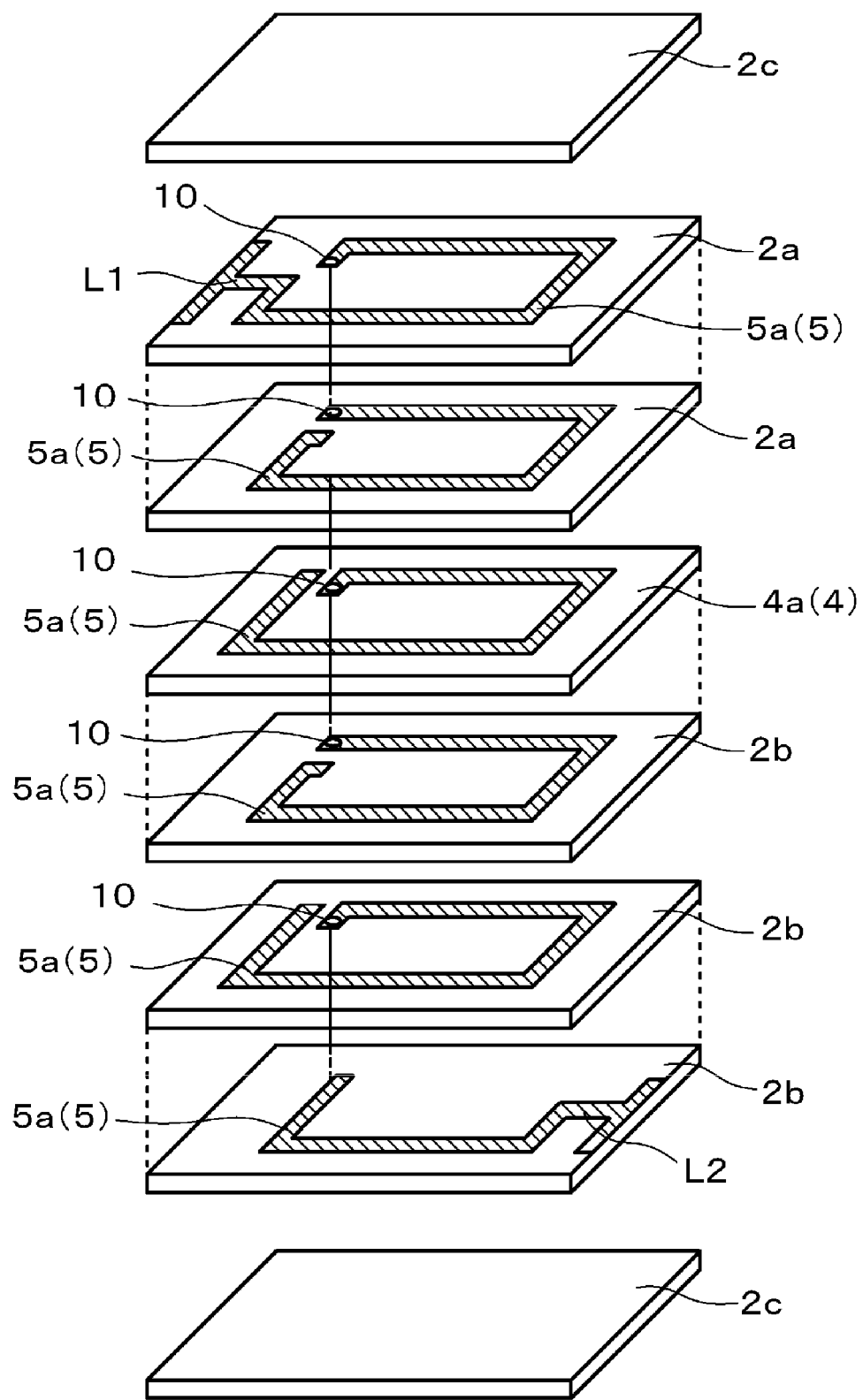
FIG. 3 is an exploded perspective view illustrating a method for producing the laminated coil component shown in FIG. 1.

The ceramic green sheets were successively laminated in the arrangement shown in FIG. 3 and subjected to thermocompression bonding so that the spiral coil L (FIG. 1) was formed.

More specifically, in the first preferred embodiment, a ceramic green sheet defining the magnetic layer 2a on which a coil conductor pattern 5a and a layer connecting via hole (conductor) 10 are formed, a ceramic green sheet defining the magnetic layer 2b on which the coil conductor pattern 5a and the layer connecting via hole (conductor) 10 are formed, a ceramic green sheet defining the outer magnetic layer 2c on which no conductor is formed, and a ceramic green sheet defining the non-magnetic layer 4a on which the coil conductor pattern 5a and the layer connecting via hole (conductor) 10 are formed as shown in FIG. 3 are preferably laminated as shown in FIG. 3. Thus, a laminated structure in which the ceramic green sheet defining the non-magnetic layer 4a is disposed at the approximate center of the laminate 11 in the lamination direction was formed and subjected to thermocompression bonding.

Next, the laminated structure that was subjected to thermocompression bonding was cut into a required shape, thereby forming an unfired laminate defining the laminated coil component 1.

Then, the unfired laminate was heated at a temperature of about 300° C. for about 180 minutes to burn a binder resin included in the laminate. Then, the resultant laminate was fired in air at a temperature of about 800° C. to about 900° C. for about 150 minutes, thereby obtaining a sintered laminate (a sintered ceramic laminate).

The sintered laminate was preferably subjected to barrel polishing, for example, in order to round corner portions thereof.

Then, a conductive paste preferably including Ag as a main component, for example, was applied to both ends of the sintered laminate by dip coating, for example, and subjected to a printing treatment at a temperature of about 700° C. for about 60 minutes, thereby forming external electrodes 21 and 22. Thus, the laminated coil component 1 having the structure shown in FIGS. 1 and 2 is obtained.

In the laminated coil component 1, a zirconium oxide is preferably added to the non-magnetic layer in a proportion of about 0.05 wt %, for example, so that the shrinkage rates between the magnetic layer and the non-magnetic layer in the heat treatment process are not significantly different from each other. Thus, a laminated coil component can be effectively produced which is not readily magnetically saturated and which has excellent direct current superposition characteristics while preventing the development of cracking, chipping, peeling, or other defects at the interface between the magnetic layer and the non-magnetic layer and the development of warpage of the laminate.

Second Preferred Embodiment

In the second preferred embodiment of the present invention, an open magnetic circuit type laminated coil component in which a zirconium oxide is added to both the magnetic layer and the non-magnetic layer will be described.

The structure and production method of the laminated coil component of the second preferred embodiment are substantially the same as those of the first preferred embodiment, and thus will be described with reference to FIGS. 1, 2, and 3.

As shown in FIGS. 1 and 2, the laminated coil component 1 is an open magnetic circuit type laminated coil component. The laminated coil component 1 includes a laminate 11 in which magnetic layers are laminated, a spiral coil L that is disposed in the laminate 11 and is defined by electrically connecting a plurality of coil conductors 5, a non-magnetic layer (non-magnetic ceramic layer) 4 that is disposed at the approximate center of the coil L in the lamination direction of the laminate 11, and external electrodes 21 and 22 that are disposed at both ends of the laminate 11 so as to extend to the ends L1 and L2 of the coil L and arranged such that the magnetic flux φ generated by the spiral coil L crosses the non-magnetic layer 4.

In the laminated coil component 1 of the second preferred embodiment, a magnetic material preferably including Ni—Cu—Zn ferrite as a main component, for example, is used as a material of the magnetic layers defining an upper portion 11a above the non-magnetic layer 4 and a lower portion 11b below the non-magnetic layer 4 in the laminate 11.

Moreover, as a material defining the non-magnetic layer 4 disposed between the upper portion 11a and the lower portion 11b of the laminate 11, a non-magnetic material including Cu—Zn ferrite as a main component, for example, is preferably used.

To the magnetic layers defining the upper portion 11a above the non-magnetic layer 4 and the lower portion 11b below the non-magnetic layer 4 and the non-magnetic layer 4, a zirconium oxide which controls a sintering rate is preferably added so that the sintering rates of the magnetic layer and the non-magnetic layer are approximately the same.

Specifically, a zirconium oxide is preferably added to the magnetic layer in a proportion of about 0.01 wt %, for example.

A zirconium oxide is preferably added to the non-magnetic layer in a proportion of about 0.03 wt %, for example.

As a result, a laminated coil component can be provided in which a difference in the shrinkage rate between the magnetic layer and the non-magnetic layer in a firing process is small, in which cracking, chipping, peeling, or other defects at the interface between the magnetic layer and the non-magnetic layer or warpage of the laminate is prevented, and which is not readily magnetically saturated, and which has excellent direct current superposition characteristics.

Next, a method for producing the laminated coil component 1 will be described with reference to FIG. 3.

First, for example, an organic or aqueous binder, a plasticizer, a dispersant, and a defoaming material were added to Ni—Cu—Zn ferrite powder and a zirconium oxide was added preferably in a proportion of about 0.01 wt %, followed by mixing, thereby preparing a ceramic slurry.

Then, the ceramic slurry was applied onto a carrier film so as to form a film preferably by a comma coater method or a doctor blade method, for example, followed by drying, thereby producing a ceramic green sheet for magnetic layer.

Similarly, for example, an organic or aqueous binder, a plasticizer, a dispersant, and a defoaming material were added to Cu—Zn ferrite powder. Then, a zirconium oxide was preferably added in a proportion of about 0.03 wt %, for example, and mixed, thereby preparing a ceramic slurry.

Then, the ceramic slurry was applied onto a carrier film so as to form a film preferably by a comma coater method or a doctor blade method, for example, followed by drying, thereby producing a ceramic green sheet for non-magnetic layer.

Next, a laser beam machine was used to form a through hole defining a via hole at a desired location of the ceramic green sheet produced by the methods described above.

Then, a conductive paste preferably including Ag or an Ag alloy as a main component, for example, was screen-printed on a desired region of the ceramic green sheet to form a coil conductor pattern.

The ceramic green sheets were successively laminated in the arrangement shown in FIG. 3 and subjected to thermocompression bonding so that the spiral coil L (FIG. 1) was formed.

More specifically, in the second preferred embodiment, a ceramic green sheet defining the magnetic layer 2a on which a coil conductor pattern 5a and a layer connecting via hole (conductor) 10 are formed, a ceramic green sheet defining the magnetic layer 2b on which the coil conductor pattern 5a and the layer connecting via hole (conductor) 10 are formed, a ceramic green sheet defining the outer magnetic layer 2c on which no conductor is formed, and a ceramic green sheet defining the non-magnetic layer 4a on which the coil conductor pattern 5a and the layer connecting via hole (conductor) 10 are arranged and laminated as shown in FIG. 3. Thus, a laminated structure in which the ceramic green sheet defining the non-magnetic layer 4a which provides a magnetic circuit gap is disposed at the approximate center of the laminate 11 in the lamination direction was formed and subjected to thermocompression bonding.

Next, the laminated structure that was subjected to thermocompression bonding was cut into a desired shape, thereby forming an unfired laminate defining the laminated coil component 1.

Then, the unfired laminate was heated at a temperature of about 300° C. for about 180 minutes to burn a binder resin contained in the laminate. Then, the resultant laminate was fired in air at a temperature of about 800° C. to about 900° C. for about 150 minutes, thereby obtaining a sintered laminate (sintered ceramic laminate).

The sintered laminate was preferably subjected to barrel polishing, for example, to round corner portion thereof.

Then, preferably, a conductive paste including Ag as a main component, for example, was applied to both ends of the sintered laminate by dip coating, and subjected to a printing treatment at a temperature of about 700° C. for about 60 minutes, thereby forming external electrodes 21 and 22. Thus, the laminated coil component 1 having a structure shown in FIGS. 1 and 2 is obtained.

In the laminated coil component 1 of the second preferred embodiment, a zirconium oxide is preferably added to the magnetic layer in a proportion of about 0.01 wt %, for example, and a zirconium oxide is preferably added to the non-magnetic layer in a proportion of about 0.03 wt %, for example, so that the shrinkage rates between the magnetic layer and the non-magnetic layer in the heat treatment process are not substantially different from each other. Thus, a laminated coil component can be effectively produced which is not readily magnetically saturated and which has excellent direct current superposition characteristics while preventing the development of cracking, chipping, peeling, or other defects at the interface between the magnetic layer and the non-magnetic layer and the development of warpage of the laminate.

Moreover, since a zirconium oxide is also preferably added to the magnetic layer, a laminated coil component having a high mechanical strength can be obtained.

Figure 4:
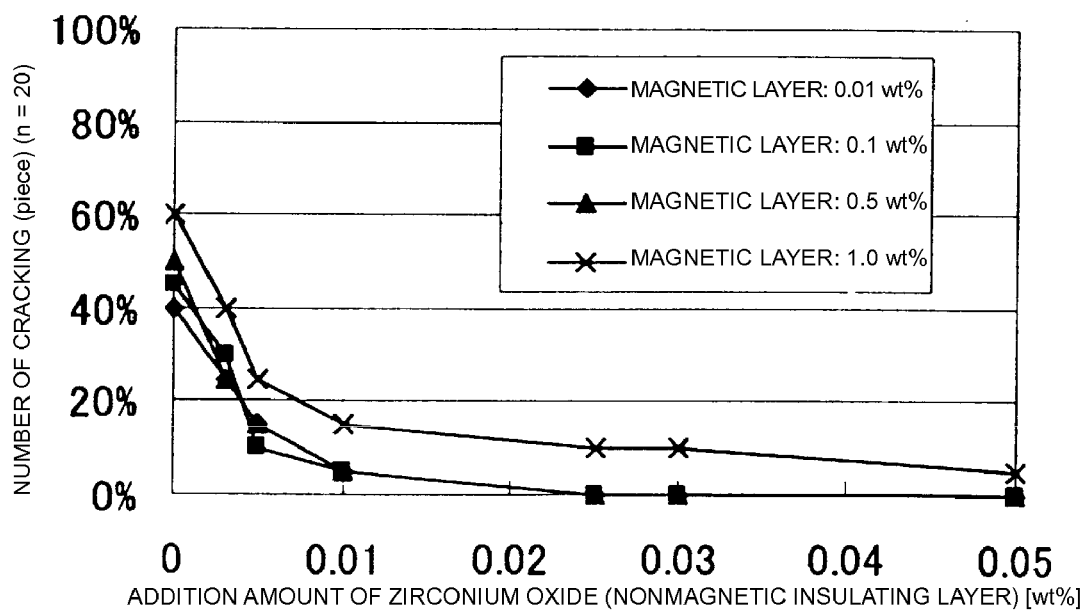
FIG. 4 illustrates the relationship between the content of zirconium oxide in a magnetic layer and a non-magnetic layer and frequencies of the development of cracking of a laminate in the laminated coil component shown in FIG. 1.
Figure 5:
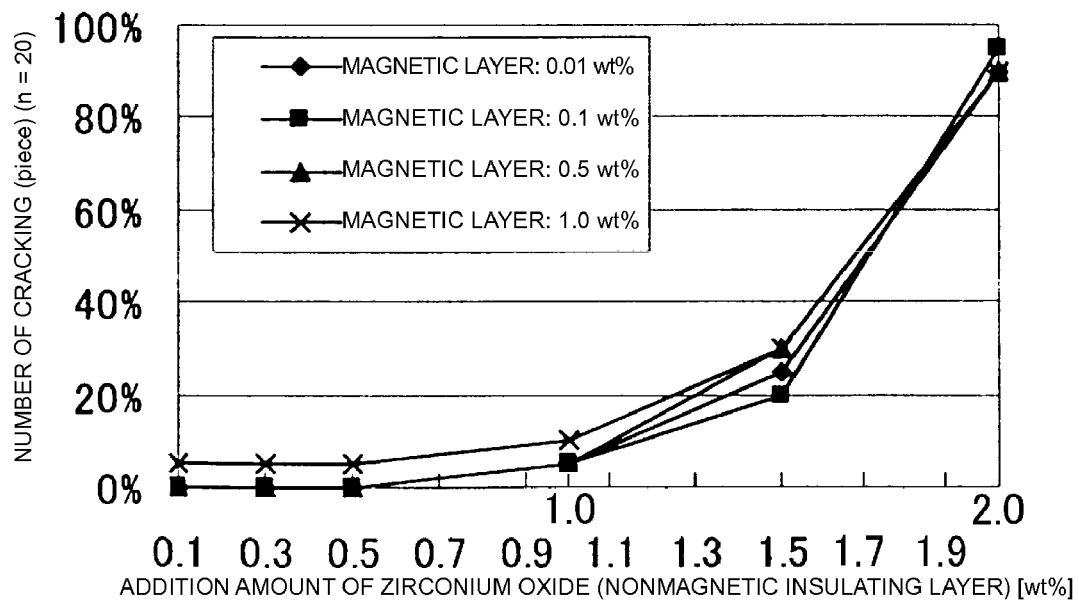
FIG. 5 illustrates the relationship between the content of zirconium oxide in a magnetic layer and a non-magnetic layer and frequencies of the development of cracking of a laminate in the laminated coil component shown in FIG. 1.

The laminated coil components having the structure shown in one of first and second preferred embodiments were analyzed for the frequency of cracking of the laminate by changing the content of the zirconium oxide in the magnetic layer to 0.00 wt % (no additive), about 0.01 wt %, about 0.1 wt %, about 0.5 wt %, and about 1.0 wt %, for example, and changing the content of the zirconium oxide in the non-magnetic layer in the range of 0.00 wt % (no additive) to about 20 wt %, for example (FIGS. 4 and 5). The results are shown in FIGS. 4 and 5.

As shown in FIGS. 4 and 5, it was confirmed that when the content of the zirconium oxide in the magnetic layer reached about 1.0 wt % or greater, the development of cracking was observed in all of the cases in which the amount of the zirconium oxide in the non-magnetic layer was changed in the above-mentioned range, and thus, such a content is not preferable.

In contrast, it was confirmed that, by adjusting the content of the zirconium oxide in the non-magnetic layer to be in the range of about 0.02 wt % to about 1.0 wt %, for example, cracking of the laminate can be efficiently prevented when the zirconium oxide in the magnetic layer was adjusted to be less than about 1.0 wt %, for example.

Based on the results, it is preferable that the proportion of the zirconium oxide in the magnetic layer be adjusted to be less than about 1.0 wt % and the proportion of the zirconium oxide in the non-magnetic layer be adjusted to be in the range of about 0.02 wt % to about 1.0 wt %, for example.

A sintered compact including only an Ni—Cu—Zn ferrite material described above in each of the preferred embodiments was formed and the content of the zirconium oxide was analyzed, which confirmed that the content of the zirconium oxide in the sintered compact is not substantially different from that in the slurry before sintering. Similarly, a sintered compact including only a Cu—Zn ferrite material described above in each of the preferred embodiments was formed and the content of the zirconium oxide was analyzed, which confirmed that the content of the zirconium oxide in the sintered compact is not substantially different from that in the slurry before sintering.

Third Preferred Embodiment

Figure 6:
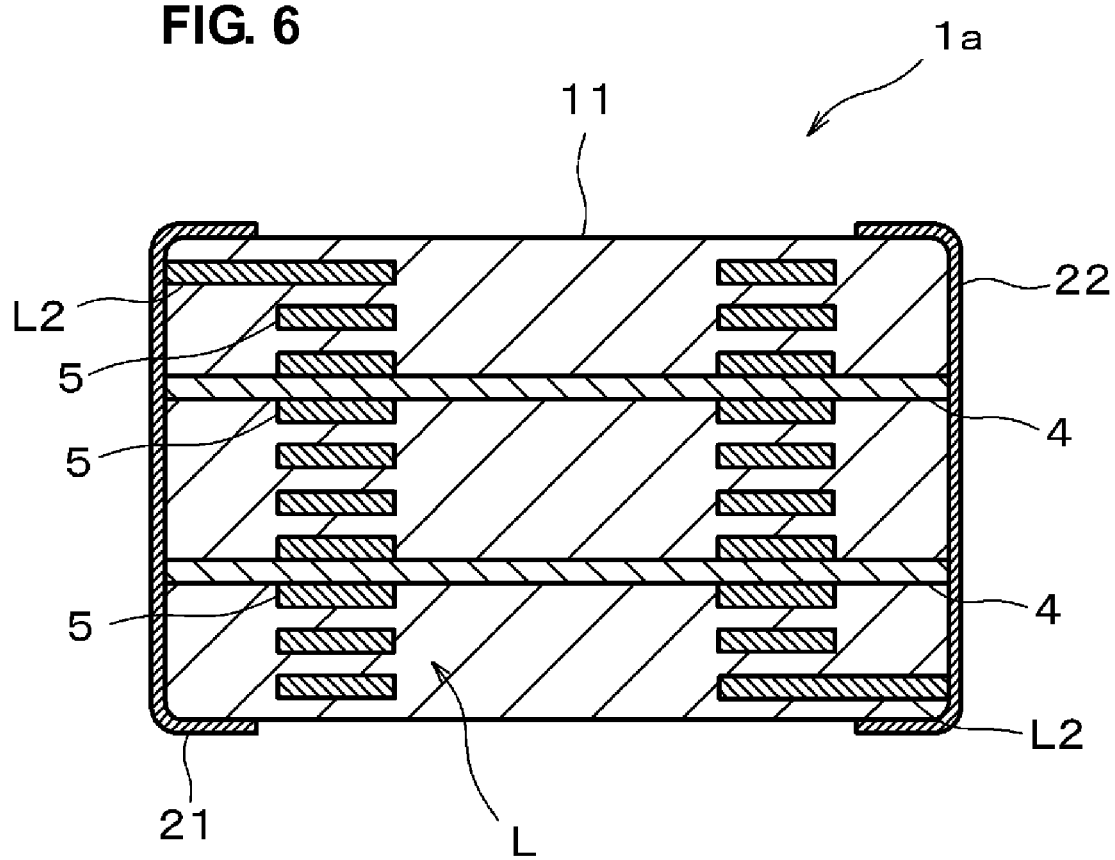
FIG. 6 is a cross section of a laminated coil component according to another preferred embodiment of the present invention.

FIG. 6 is a cross section of a laminated coil component according to a third preferred embodiment of the present invention.

A laminated coil component 1a is an open magnetic circuit type laminated coil component having a structure in which, in a laminate 11 in which a spiral coil L is disposed and magnetic layers are laminated, two non-magnetic layers 4 are disposed in the lamination direction at desired intervals as shown in FIG. 6.

In addition, in the laminated coil component of the third preferred embodiment, to the magnetic layer and the non-magnetic layer 4 forming the laminate, a zirconium oxide which controls a sintering rate is preferably added in a proportion such that the sintering rates of the magnetic layer and the non-magnetic layer are approximately the same.

Specifically, a zirconium oxide was added to the magnetic layer preferably in a proportion of about 0.01 wt %, for example, and a zirconium oxide is added to the non-magnetic layer preferably in a proportion of about 0.03 wt %, for example.

The fundamental structures of remaining portions of the laminated coil component 1a of the third preferred embodiment are substantially the same as those of the first and second preferred embodiments. The laminated coil component 1a of the third preferred embodiment can be produced in substantially the same manner as in the first and second preferred embodiment. In FIG. 6, portions designated by the same reference numerals as those in FIGS. 1 to 3 correspond to those of FIGS. 1 to 3.

In addition, in the laminated coil component 1a of the third preferred embodiment, a difference in the shrinkage rate between the magnetic layer and the non-magnetic layer in a firing process is small. Therefore, a laminated coil component that is not readily magnetically saturated and that has excellent direct current superposition characteristics, while preventing cracking, chipping, peeling, or other defects at the interface between the magnetic layer and the non-magnetic layer and warpage of the laminate.

Figure 7:
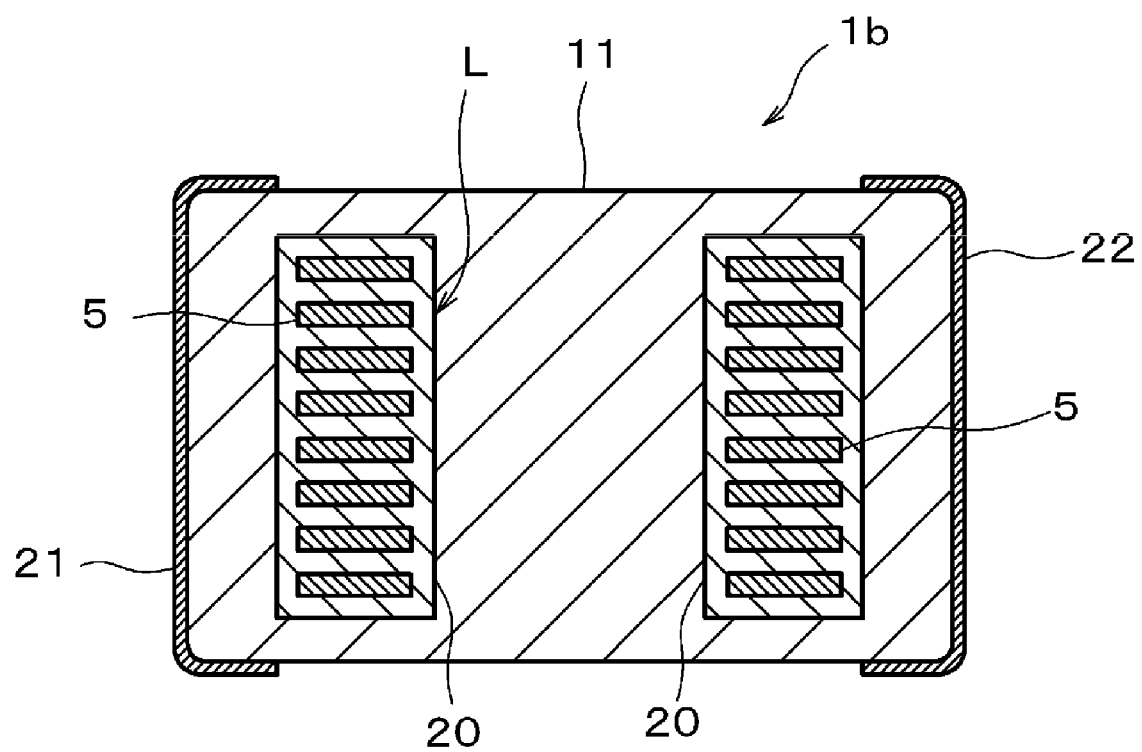
FIG. 7 is a cross section of a laminated coil component according to another preferred embodiment of the present invention.

In particular, by providing two non-magnetic layers 4 in the laminated coil component 1a of the third preferred embodiment, more magnetic fields can leak outside the coil L, and thus, magnetic saturation can be more efficiently reduced, as compared to the laminated coil components of the first and second preferred embodiments in which one non-magnetic layer 4 is provided Fourth Preferred Embodiment FIG. 7 is a cross section of a laminated coil component according to a fourth preferred embodiment of the present invention.

A laminated coil component 1b of the fourth preferred embodiment is an open magnetic circuit type laminated coil component having a structure in which non-magnetic regions 20 each made of a non-magnetic layer are arranged to surround coil conductors 5 defining a spiral coil L of a laminate 11 in which the coil L is disposed and a magnetic layer is laminated as illustrated in FIG. 7.

In addition, when the non-magnetic regions 20 made of a non-magnetic layer are arranged around the coil conductors 5 surrounding the coil conductors 5 as in the laminated coil component of Example 4, an open magnetic circuit type laminated coil component can be obtained which is not readily magnetically saturated and which has excellent direct current superposition characteristics by increasing a magnetic resistance of a magnetic circuit.

Figure 8A:
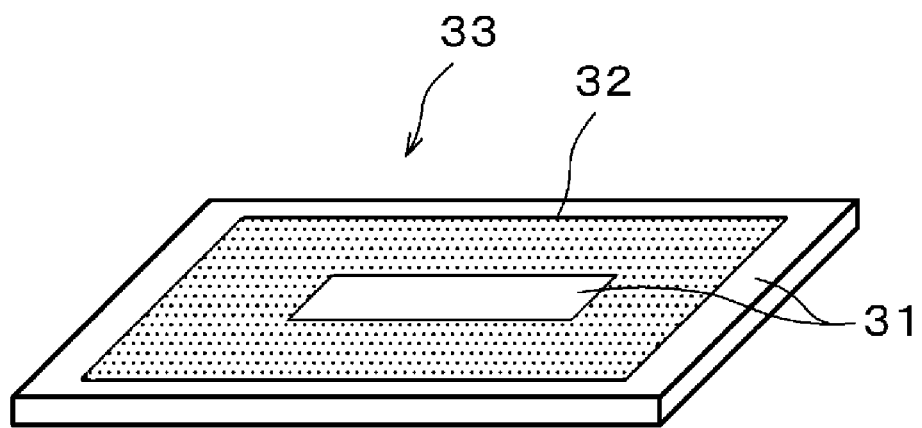
FIGS. 8A and 8B are perspective views illustrating a method for producing the laminated coil component shown in FIG. 7.
Figure 8B:
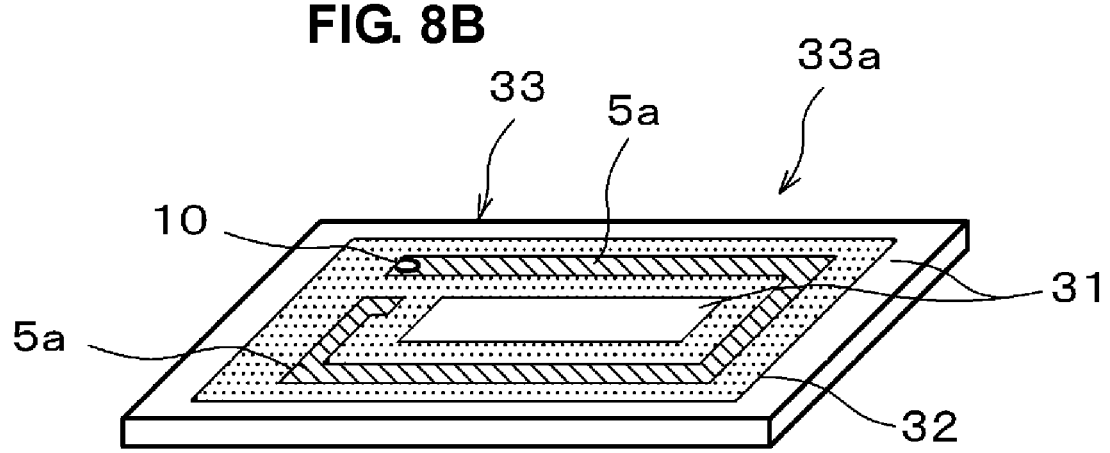
Figure 9:
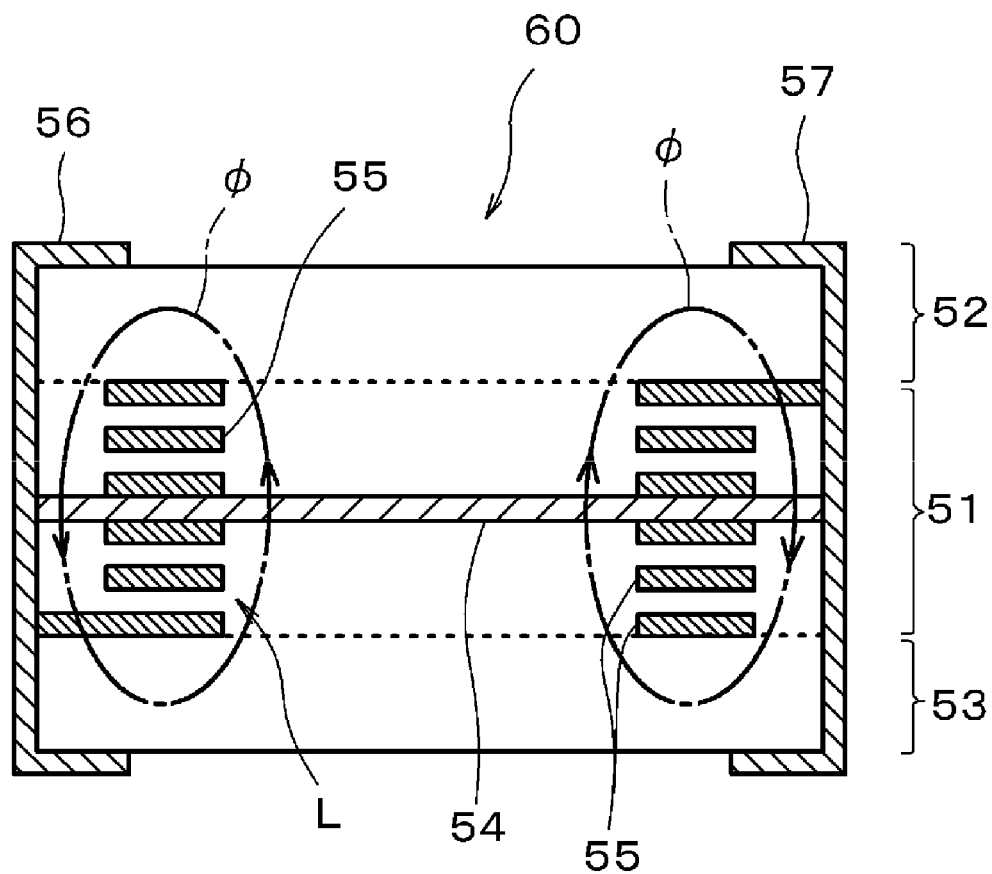
FIG. 9 is a cross section of an open magnetic circuit type laminated coil component of the related art.

The laminated coil component of the fourth preferred embodiment can preferably be produced by, for example, processes of printing a ceramic slurry 31 including a magnetic ceramic as a main component to the center and the periphery as shown in FIG. 8A, printing a ceramic slurry 32 preferably including a non-magnetic ceramic as a main component to an annular region, where the ceramic slurry 31 including a magnetic ceramic as a main component is not printed, as shown in FIG. 8B, preparing an electrode forming ceramic green sheet 33a in which a coil conductor pattern 5a is printed on the formed ceramic green sheet 33, laminating the electrode forming ceramic green sheet 33a in a desired order, and laminating, to upper and lower sides, a ceramic green sheet defining an outer layer whose entire surface is made of a magnetic layer and on which no coil conductor pattern is formed to form a laminate.

All of the laminated coil components according to the preferred embodiments described above can preferably be produced by a sheet lamination method including a process of laminating a ceramic green sheet as described above. However, the laminated coil components according to preferred embodiments can preferably be produced by a sequential printing method including preparing a magnetic ceramic slurry, a non-magnetic ceramic slurry, and an electrode paste, and printing them so as to form the laminates each having a structure shown in each of the preferred embodiments.

Furthermore, the laminated coil components can preferably be produced by, for example, a sequentially transferring method including transferring, to a table, a ceramic layer formed by printing or applying a ceramic slurry onto a carrier film, transferring thereon an electrode paste layer formed by printing or applying an electrode paste onto a carrier film, and repeating the process.

The laminated coil component according to preferred embodiments of the present invention can also be produced by other methods, and there is no limitation on a specific production method therefor.

In addition, when any method is used, the above-described effects particular to preferred embodiments of the present invention can be obtained.

Each of the preferred embodiments described above describes the production of the laminated coil component one by one as an example. However, in mass-production, the laminated coil component can preferably be produced by using a multi-piece production method including printing a large number of coil conductor patterns on the surface of a mother ceramic green sheet, laminating a plurality of the mother ceramic green sheets and bonding them by pressure to form an unfired laminate block, cutting the laminate block according to the arrangement of the coil conductor patterns, and cutting out a laminate for each laminated coil component, thereby simultaneously producing a large number of laminated coil components.

Each of the above-described preferred embodiments describes a case in which the laminated coil component is a laminated inductor as an example. However, preferred embodiments of the present invention can preferably be applied to various open magnetic circuit type laminated coil components, such as a laminated impedance element or a laminated transformer, for example.

Each of the above-described preferred embodiments describes a case in which a laminated coil component having a structure in which a magnetic layer and a non-magnetic layer are laminated as an example. However, preferred embodiments of the present invention can be applied to a case in which the non-magnetic layer is completely or partially a low magnetic permeability layer.

The present invention is not limited to the above-described preferred embodiments, and various applications and modifications can be made to the arrangement of the non-magnetic layer, a specific structure of the coil conductor, and a material used to define the magnetic layer and the non-magnetic layer without departing from the scope of the present invention.

As described above, according to preferred embodiments of the present invention, a laminated coil component having a high reliability can be effectively produced which can prevent the development of cracking, chipping, peeling or other defects at the interface between the magnetic layer and the non-magnetic layer or the low magnetic permeability layer and the development of warpage of the laminate, which is not readily magnetically saturated, and which has excellent direct current superposition characteristics.

Therefore, preferred embodiments of the present invention can be widely applied to the fields of the open magnetic circuit type laminated coil component having a laminate in which a magnetic layer and a non-magnetic layer or a low magnetic permeability layer are laminated and a coil conductor disposed thereinside.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An open magnetic circuit type laminated coil component comprising:
   a sintered ceramic laminate including a magnetic layer and a non-magnetic layer laminated to one another; and
   a coil conductor disposed in the laminate; wherein
   the non-magnetic layer is made of a material including Cu—Zn as a main component, includes a zirconium oxide, and does not include Ni;
   the magnetic layer includes another zirconium oxide; and
   an amount of the zirconium oxide included in the non-magnetic layer is greater than an amount of the another zirconium oxide included in the magnetic layer.

2. The laminated coil component according to claim 1, wherein a content of the zirconium oxide in the non-magnetic layer is in a range of about 0.02 wt % to about 1.0 wt %.

3. The laminated coil component according to claim 1, wherein a content of the another zirconium oxide in the magnetic layer is less than about 1.0 wt %.

4. The laminated coil component according to claim 1, wherein the magnetic layer is made of a material including Ni—Cu—Zn ferrite as a main component.

* * * * *